(12) United States Patent
Karasawa et al.

(10) Patent No.: US 12,088,763 B2
(45) Date of Patent: Sep. 10, 2024

(54) RECORDING DEVICE INCLUDING MEDIUM TRAY HAVING A FIRST AND SECOND REGION

(71) Applicant: SEIKO EPSON CORPORATION, Tokyo (JP)

(72) Inventors: Shumi Karasawa, Matsumoto (JP); Takuro Furusawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/193,309

(22) Filed: Mar. 30, 2023

(65) Prior Publication Data

US 2023/0319191 A1 Oct. 5, 2023

(30) Foreign Application Priority Data

Apr. 1, 2022 (JP) ................................ 2022-061672

(51) Int. Cl.
*H04N 1/00* (2006.01)

(52) U.S. Cl.
CPC ..... *H04N 1/00007* (2013.01); *H04N 1/00551* (2013.01); *H04N 1/00557* (2013.01); *H04N 1/0057* (2013.01); *H04N 2201/0072* (2013.01)

(58) Field of Classification Search
None
See application file for complete search history.

(56) References Cited

U.S. PATENT DOCUMENTS

| | | | | |
|---|---|---|---|---|
| 2007/0075476 A1* | 4/2007 | Shiohara | ................. | B65H 1/28 271/9.01 |
| 2007/0075477 A1* | 4/2007 | Shiohara | ................. | B65H 1/28 271/9.08 |
| 2011/0158725 A1* | 6/2011 | Asada | ..................... | B41J 11/58 399/397 |
| 2013/0001850 A1* | 1/2013 | Okano | ................... | B65H 1/266 271/3.14 |
| 2013/0083372 A1* | 4/2013 | Osakabe | ........... | H04N 1/00557 358/488 |
| 2013/0277170 A1* | 10/2013 | Samoto | ................. | B65G 39/18 198/367 |
| 2014/0319761 A1* | 10/2014 | Komuro | ................. | B65H 31/20 271/223 |
| 2014/0319768 A1* | 10/2014 | Komuro | ................. | B65H 31/02 271/223 |
| 2016/0347570 A1* | 12/2016 | Sugiyama | ............. | B65H 43/04 |
| 2019/0359441 A1* | 11/2019 | Suzuki | ................... | B65H 31/26 |
| 2023/0269333 A1* | 8/2023 | Kikumoto | .......... | H04N 1/00042 358/1.13 |

FOREIGN PATENT DOCUMENTS

JP 2016-179899 A 10/2016

* cited by examiner

*Primary Examiner* — Henok Shiferaw
(74) *Attorney, Agent, or Firm* — WORKMAN NYDEGGER (57) ABSTRACT

A recording device includes a recording unit configured to perform recording on media, a main body provided with the recording unit, and a medium accommodation unit configured to be attached to and detached from the main body and configured to accommodate the media, wherein the medium accommodation unit includes a first region configured to accommodate a pre-recording medium before being subjected to recording by the recording unit, and a second region configured to accommodate a recorded medium after being subjected to the recording by the recording unit.

15 Claims, 12 Drawing Sheets

RECORDING DEVICE INCLUDING MEDIUM TRAY HAVING A FIRST AND SECOND REGION

The present application is based on, and claims priority from JP Application Serial Number 2022-061672, filed Apr. 1, 2022, the disclosure of which is hereby incorporated by reference herein in its entirety.

BACKGROUND

1. Technical Field

The present disclosure relates to a recording device.

2. Related Art

Various recording devices have been used. For example, JP-A-2016-179899 discloses a recording device including a medium accommodation unit that accommodates a sheet before being subjected to recording by a recording head, and a discharge tray that is provided above the medium accommodation unit in a gravitational direction and at which the sheet after being subjected to the recording by the recording head is placed.

Some recording devices used in the related art are desired to be as small as possible, examples of which include a recording device specialized in recording of a photograph. Such a recording device may be particularly desired to be small in a gravitational direction. However, in the configuration of the recording device in the related art, a constituent member that accommodates a pre-recording medium before recording and a constituent member that accommodates a recorded medium after the recording are separately configured. This makes the device configuration inefficient. Further, the constituent member that accommodates the pre-recording medium and the constituent member that accommodates the recorded medium are disposed overlapping each other as viewed from the gravitational direction. For this reason, when the configuration of the recording device in the related art is downsized in the gravitational direction, the number of media that can be accommodated is reduced.

SUMMARY

A recording device according to an aspect of the present disclosure for solving the above problem includes a recording unit configured to perform recording on media, a main body provided with the recording unit, and a medium accommodation unit configured to be attached to and detached from the main body and configured to accommodate the media, wherein the medium accommodation unit includes a first region configured to accommodate, among the media, a pre-recording medium before being subjected to recording by the recording unit, and a second region configured to accommodate, among the media, a recorded medium after being subjected to the recording by the recording unit.

DESCRIPTION OF EXEMPLARY EMBODIMENTS

First, the present disclosure will be schematically described.

A recording device according to a first aspect of the present disclosure for solving the above problem includes a recording unit configured to perform recording on media, a main body provided with the recording unit, and a medium accommodation unit configured to be attached to and detached from the main body and configured to accommodate the media, wherein the medium accommodation unit includes a first region configured to accommodate, among the media, a pre-recording medium before being subjected to recording by the recording unit, and a second region configured to accommodate, among the media, a recorded medium after being subjected to the recording by the recording unit.

According to this aspect, the medium accommodation unit includes the first region that accommodates the pre-recording medium and the second region that accommodates the recorded medium. The medium accommodation unit is configured to accommodate both the pre-recording medium and the recorded medium in this manner, which can make the device configuration efficient. Thus, it is possible to increase the number of media that can be accommodated without upsizing of the device in the gravitational direction.

A recording device according to a second aspect of the present disclosure is a recording device in the first aspect, wherein the medium accommodation unit includes the first region and the second region at positions not overlapping each other as viewed from a gravitational direction, and a medium accommodation space in the first region and a medium accommodation space in the second region overlap each other in the gravitational direction.

According to this aspect, the first region and the second region are disposed at positions not overlapping each other as viewed from the gravitational direction, and the medium accommodation space in the first region and the medium accommodation space in the second region overlap each other in the gravitational direction. Such a configuration can make the device configuration particularly efficient. Thus, it is possible to particularly increase the number of media that can be accommodated without upsizing of the device in the gravitational direction.

A recording device according to a third aspect of the present disclosure is a recording device in the first or second aspect, wherein the medium accommodation unit is attached to the main body by being inserted in an insertion direction through an opening portion provided at the main body, the medium accommodation unit includes, on a rear end side in the insertion direction, an opening/closing cover configured to be opened and closed in a state where the medium accommodation unit is attached to the main body, when the opening/closing cover is brought into an open state, at least part of the media is placeable at the opening/closing cover, and by being brought into a closed state, the opening/closing cover is configured to close the opening portion.

According to this aspect, the medium accommodation unit includes the opening/closing cover. When the medium accommodation unit is brought into the open state, at least part of the media is placeable at the medium accommodation unit, and by being brought into the closed state, the opening/closing cover is configured to close the opening portion. Since the opening/closing cover in the open state also serves as a medium placement space, it is possible to downsize the device in a direction intersecting the gravitational direction when the opening/closing cover is in the closed state. In addition, with such a configuration, since the opening portion can be closed when the opening/closing cover is in the closed state, it is possible to suppress foreign matter such as dust entering the main body through the opening portion.

A recording device according to a fourth aspect of the present disclosure is a recording device in the third aspect, wherein the medium accommodation unit includes the first region on a front end side in the insertion direction and includes the second region on a rear end side in the insertion direction, and when the medium accommodation unit is brought into the open state, at least part of the recorded medium is placeable at the medium accommodation unit.

According to this aspect, the medium accommodation unit includes the first region on the front end side in the insertion direction and the second region on the rear end side in the insertion direction. With such a configuration, a user can take out the recorded medium from the recording device without detaching the medium accommodation unit from the main body. That is, workability of the user can be improved.

A recording device according to a fifth aspect of the present disclosure is a recording device in the third aspect, further including a transport unit configured to transport the media in a transport direction, a moving mechanism configured to reciprocate the recording unit in a width direction intersecting the transport direction, a maintaining unit configured to maintain the opening/closing cover in the closed state, and a release mechanism configured to release the closed state of the opening/closing cover, wherein the release mechanism is configured to start a release operation of releasing the closed state of the opening/closing cover in conjunction with movement of the recording unit in the width direction.

According to this aspect, the release mechanism can start the release operation of releasing the closed state of the opening/closing cover in conjunction with movement of the recording unit in the width direction. Thus, the release operation can automatically start in conjunction with movement of the recording unit in the width direction upon start of recording. Thus, it is possible to save the user the trouble of opening the opening/closing cover and suppress damage to the medium by the opening/closing cover forgotten to be opened.

A recording device according to a sixth aspect of the present disclosure is a recording device in the third aspect, further including an opening/closing velocity adjustment unit configured to adjust an opening/closing velocity of the opening/closing cover when posture is changed from the closed state to the open state.

According to this aspect, provided is the opening/closing velocity adjustment unit that adjusts the opening/closing velocity of the opening/closing cover when the posture is changed from the closed state to the open state. Thus, for example, it is possible to suppress a situation in which the user opens the opening/closing cover too vigorously, the opening/closing cover violently collides with the installation surface of the recording device, and the opening/closing cover is damaged.

A recording device according to a seventh aspect of the present disclosure is a recording device in the third aspect, further including an opening/closing sensor configured to detect whether the opening/closing cover is in the open state or the closed state.

According to this aspect, provided is the opening/closing sensor that detects whether the opening/closing cover is in the open state or the closed state. Thus, for example, by using the detection result of the opening/closing sensor, it is possible to eliminate an operation of opening the opening/closing cover before start of recording when the opening/closing cover is in the open state, and shorten the recording start operation.

Details of the present disclosure will be described below. In each of the drawings, a direction along an X-axis is a device width direction and is a direction intersecting a transport direction of a medium, that is, a width direction. A −X direction is a right direction, and a +X direction is a left direction as viewed from a user when a front surface of the device faces the user. A direction along a Y-axis is a device depth direction, and a +Y direction is a direction from the back toward the front of the device. A −Y direction is a direction from the front toward the back of the device. A direction along a Z-axis is a vertical direction, a +Z direction is a vertically upward direction, and a −Z direction is a vertically downward direction.

Figure 1:
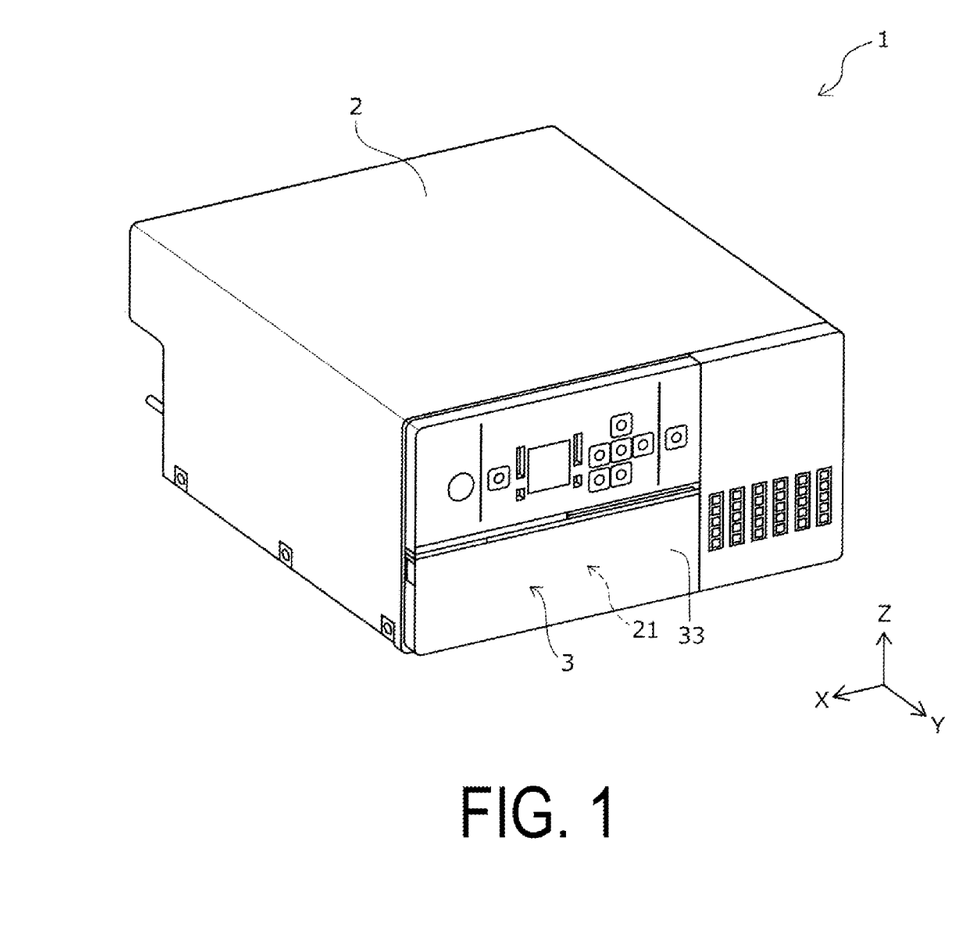
FIG. 1 is a perspective view of a recording device according to an embodiment of the present disclosure.

First, an appearance of a recording device 1 according to an embodiment of the present disclosure will be described with reference to FIG. 1. The recording device 1 according to the embodiment illustrated in FIG. 1 is, for example, an ink jet printer for performing recording on a photographic recording medium having a size of, for example, 6 inches×4 inches. However, the present disclosure is not limited to an ink jet printer for performing recording on a photographic recording medium.

As illustrated in FIG. 1, the recording device 1 includes a main body 2 and a medium accommodation unit 3 attachable to and detachable from the main body 2. Here, the medium accommodation unit 3 can be attached to the main body 2 by being inserted into the main body 2 through an opening portion 21 provided at the front surface of the main body 2, and can be detached from the main body 2 by being pulled out from the main body 2 through the opening portion 21. That is, the attachment direction of the medium accommodation unit 3 to the main body 2 is the −Y direction, and the detachment direction of the medium accommodation unit 3 from the main body 2 is the +Y direction.

Figure 2:
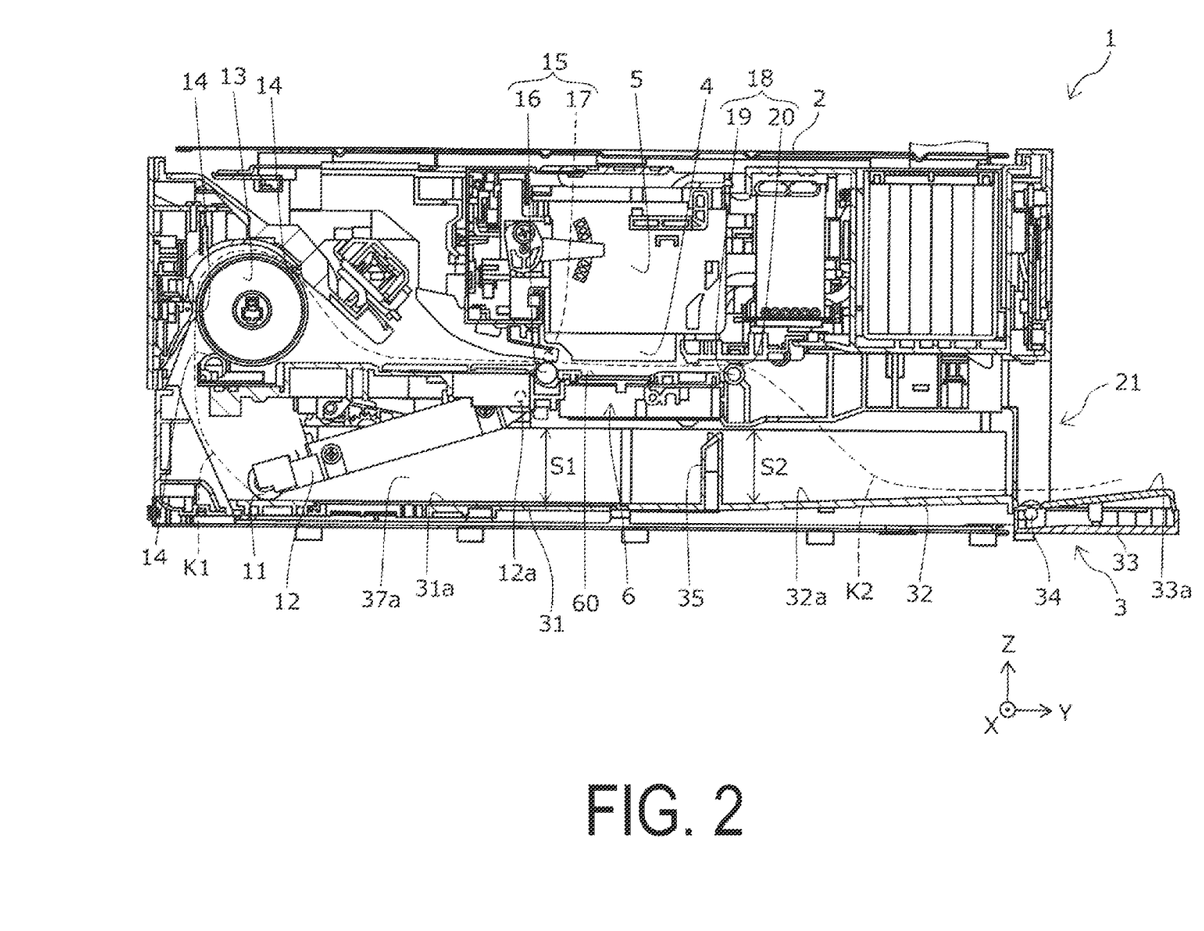
FIG. 2 is a side cross-sectional view illustrating an internal configuration of the recording device of FIG. 1.

Next, an internal configuration of the recording device 1 will be described with reference to FIG. 2 from the viewpoint of a transport path of the medium. As illustrated in FIG. 2, the opening portion 21 is provided at the front surface of the main body 2, and the medium accommodation unit 3 can be attached to the main body 2 by being inserted in the −Y direction into the main body 2 through the opening portion 21, and can be detached from the main body 2 by being pulled out in the +Y direction from the main body 2 through the opening portion 21.

Although details of the medium accommodation unit 3, which is a main unit of the recording device 1 according to the embodiment, will be described later, the medium accommodation unit 3 includes a first region 31 that accommodates a pre-recording medium that is a medium before recording, and a second region 32 that accommodates a recorded medium after recording is performed by an ejecting head 4 serving as a recording unit described later. The first region 31 and the second region 32 are partitioned by a partition wall 35. The presence of the partition wall 35 can suppress the pre-recording medium and the recorded medium being mixedly placed. In addition, the medium accommodation unit 3 includes an opening/closing cover 33 that can be opened and closed relative to a rotation shaft 34 in a state in which the medium accommodation unit 3 is attached to the main body 2. When the opening/closing cover 33 is brought into an open state as illustrated in FIG. 2, an end portion of the recorded medium on the +Y direction side can be placed at the opening/closing cover 33, and by being brought into a closed state as illustrated in FIG. 1, the opening/closing cover 33 can close the opening portion 21.

A transport path of the medium will be described below. The recording device 1 according to the embodiment transports the pre-recording medium accommodated in the first region 31 to a position facing the ejecting head 4 along a transport path K1, performs recording by the ejecting head 4, and then transports the recorded medium to the second region 32 along a transport path K2. The recording device 1 according to the embodiment includes a feeding roller 11 at a position facing the first region 31 in a state in which the medium accommodation unit 3 is attached to the main body 2. The feeding roller 11 is supported by a supporting member 12 that swings about a swing shaft 12a, and the swing of the supporting member 12 advances and retreats the feeding roller 11 toward and from the pre-recording medium accommodated in the first region 31.

The pre-recording medium accommodated in the first region 31 is transported along the transport path K1 by the feeding roller 11 to a position facing a rotating roller 13. A plurality of driven rollers 14 are provided around the rotating roller 13. The pre-recording medium is transported while being nipped between the rotating roller 13 and the driven rollers 14, and thus transported to a nip position of a transport roller pair 15 including a driving roller 16 and a driven roller 17 along the transport path K1.

At a position facing the ejecting head 4, recording is performed on the pre-recording medium transported to the nip position of the transport roller pair 15 along the transport path K1. The ejecting head 4 according to the embodiment is provided at a carriage 5 that reciprocates in the X-axis direction, and is a so-called serial-type ink jet head that ejects ink while reciprocating in the X-axis direction together with the carriage 5. A predetermined amount of transport by the transport roller pair 15 and an operation in which the ejecting head 4 ejects ink while reciprocating in the X-axis direction are repeated, and thus recording is performed on the pre-recording medium transported to the position facing the ejecting head 4. As a result, a recorded medium is generated.

A front end side, in the transport direction, of the recorded medium on which the recording has been performed by the ejecting head 4 is transported to a nip position of a discharge roller pair 18 including a driving roller 19 and a driven roller 20. Then, the recorded medium is discharged along the transport path K2 to the second region 32 by the discharge roller pair 18.

Here, the recording device 1 according to the embodiment is a recording device capable of performing borderless recording in which an image is formed edge to edge of the medium. A platen 60 supporting the medium during recording is provided at a position 6 facing the ejecting head 4. At the position 6 facing the ejecting head 4, a portion of the platen 60 corresponding to the edge of the medium is configured to be lower than a portion of the platen 60 supporting the medium so that ink does not adhere to the surface of the platen 60 and the ink adhering to the surface of the platen 60 does not adhere to the medium and stain the medium in the borderless recording.

Hereinafter, the medium accommodation unit 3, which is a main unit of the recording device 1 according to the embodiment, and an opening/closing mechanism 100 of the opening/closing cover 33 of the medium accommodation unit 3 will be described in detail with reference to FIGS. 3 to 12, in addition to FIG. 2. As described above, the recording device 1 according to the embodiment includes the ejecting head 4 serving as a recording unit that performs recording on the medium, the main body 2 provided with the ejecting head 4, and the medium accommodation unit 3 that is attachable to and detachable from the main body 2 and that accommodates the medium.

Among these elements, the medium accommodation unit 3 according to the embodiment includes the first region 31 that accommodates, among the media, the pre-recording medium before being subjected to recording by the ejecting head 4, and the second region 32 that accommodates, among the media, the recorded medium after being subjected to the recording by the ejecting head 4. In the recording device 1 according to the embodiment, the medium accommodation unit 3 can accommodate both the pre-recording medium and the recorded medium in this manner, which can make the device configuration efficient. This can increase the number of media that can be accommodated without upsizing of the device in the gravitational direction. On the other hand, when the number of media to be accommodated is not increased, it is possible to achieve a working effect of configuring the device that is low in the device height direction.

Figure 12:
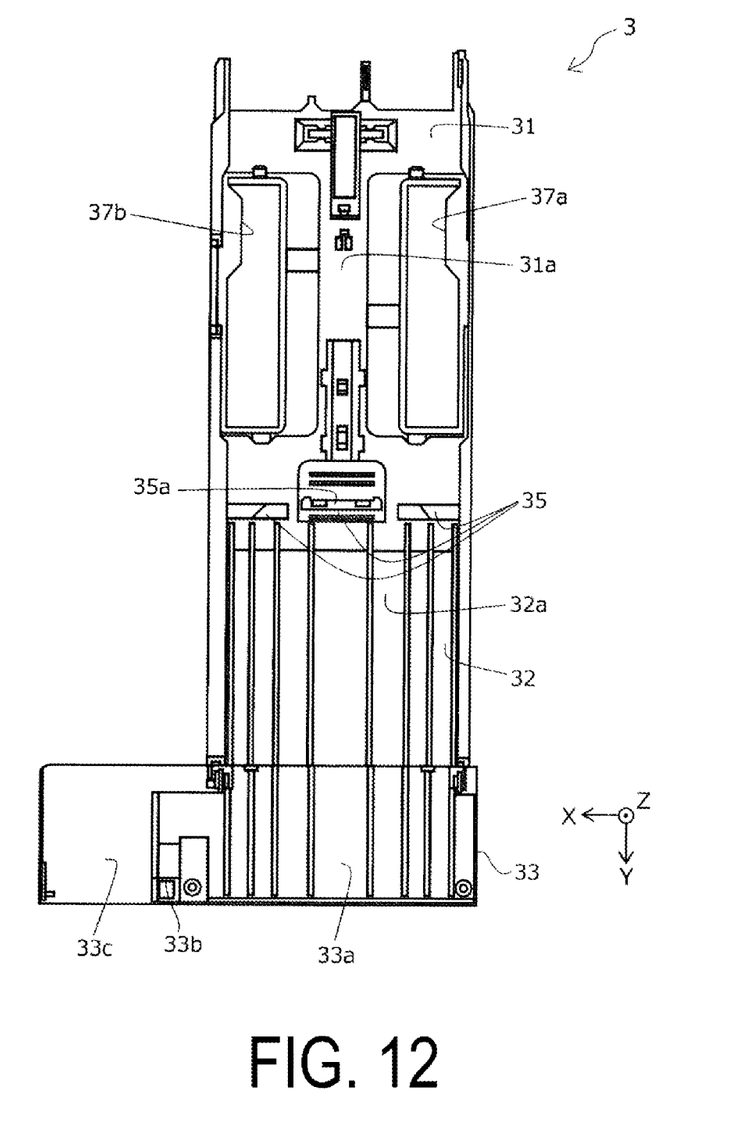
FIG. 12 is a plan view illustrating the medium accommodation unit of the recording device of FIG. 1.

Here, as illustrated in FIG. 12 and the like, in the medium accommodation unit 3, the first region 31 and the second region 32 are partitioned by the partition wall 35, and the first region 31 and the second region 32 are disposed at positions not overlapping each other as viewed from the gravitational direction corresponding to the Z-axis direction. In addition, a medium accommodation space S1 in the first region 31 and a medium accommodation space S2 in the second region 32 illustrated in FIG. 2 are disposed at positions overlapping each other in the gravitational direction, that is, at positions overlapping each other as viewed from the Y-axis direction. The recording device 1 according to the embodiment is configured in this manner and thus can make the device configuration particularly efficient. Thus, in the recording device 1 according to the embodiment, it is possible to particularly increase the number of media that can be accommodated without upsizing of the device in the gravitational direction.

Figure 3:
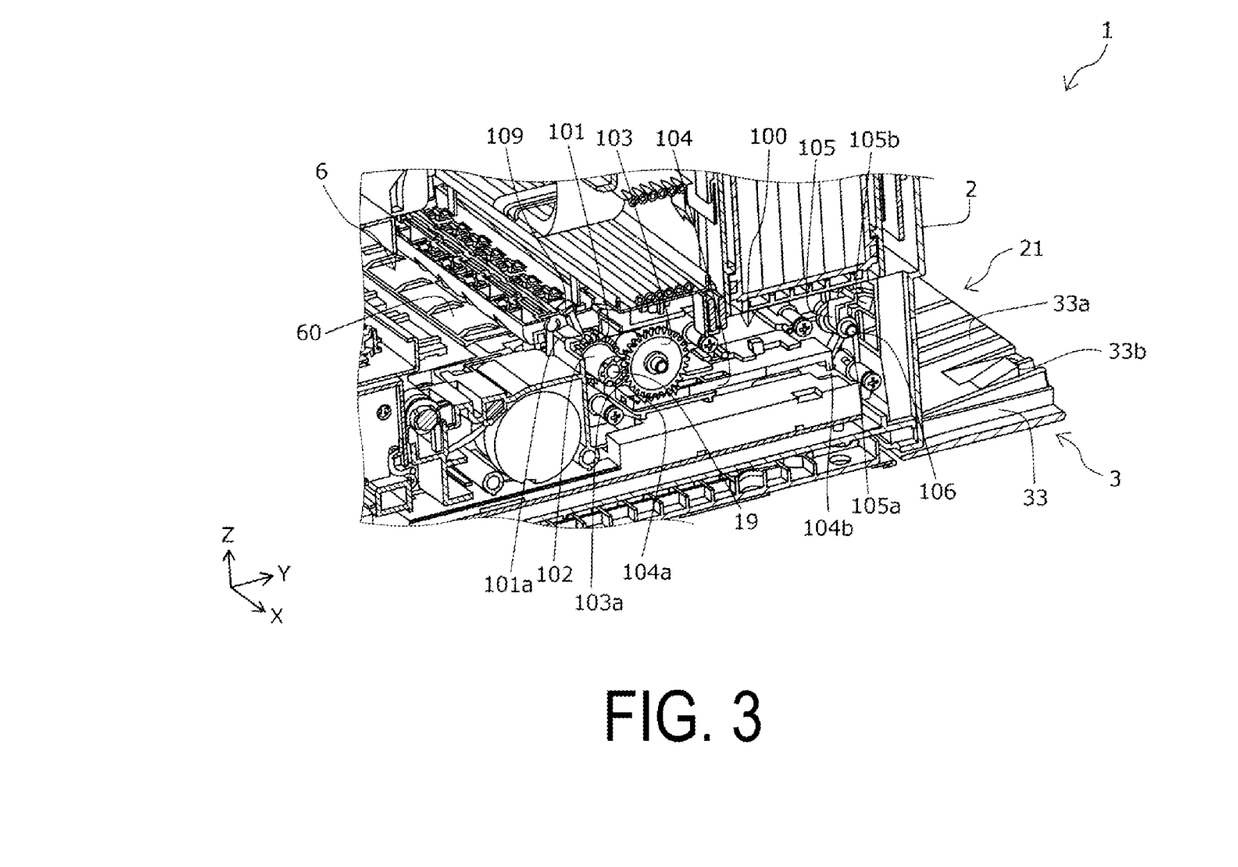
FIG. 3 is a perspective view illustrating a periphery of an opening/closing mechanism of an opening/closing cover of the recording device of FIG. 1.
Figure 4:
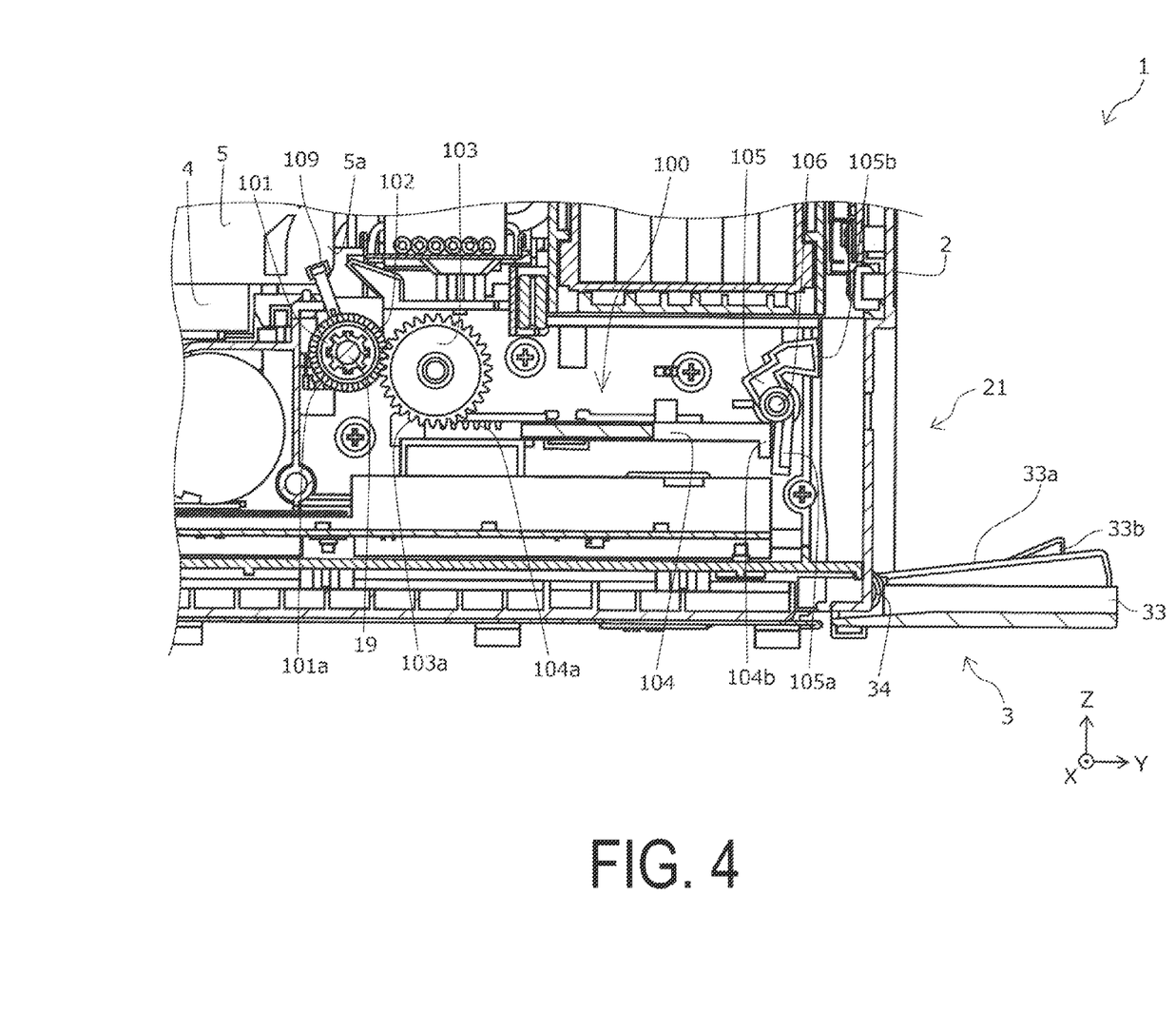
FIG. 4 is a side cross-sectional view illustrating the periphery of the opening/closing mechanism of the opening/closing cover of the recording device of FIG. 1 when the opening/closing cover is in an open state.
Figure 5:
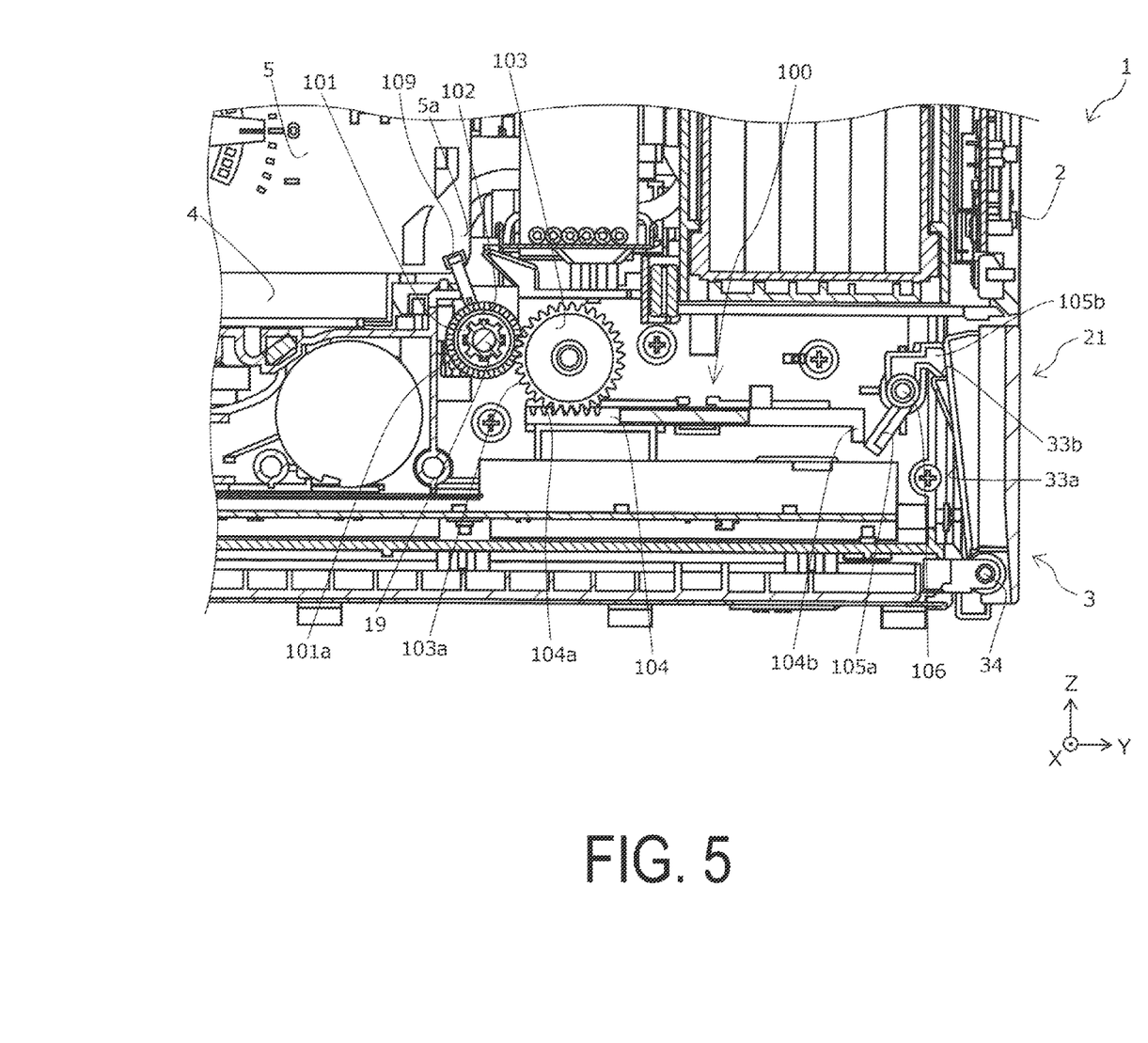
FIG. 5 is a side cross-sectional view illustrating the periphery of the opening/closing mechanism of the opening/closing cover of the recording device of FIG. 1 when the opening/closing cover is in a closed state.
Figure 6:
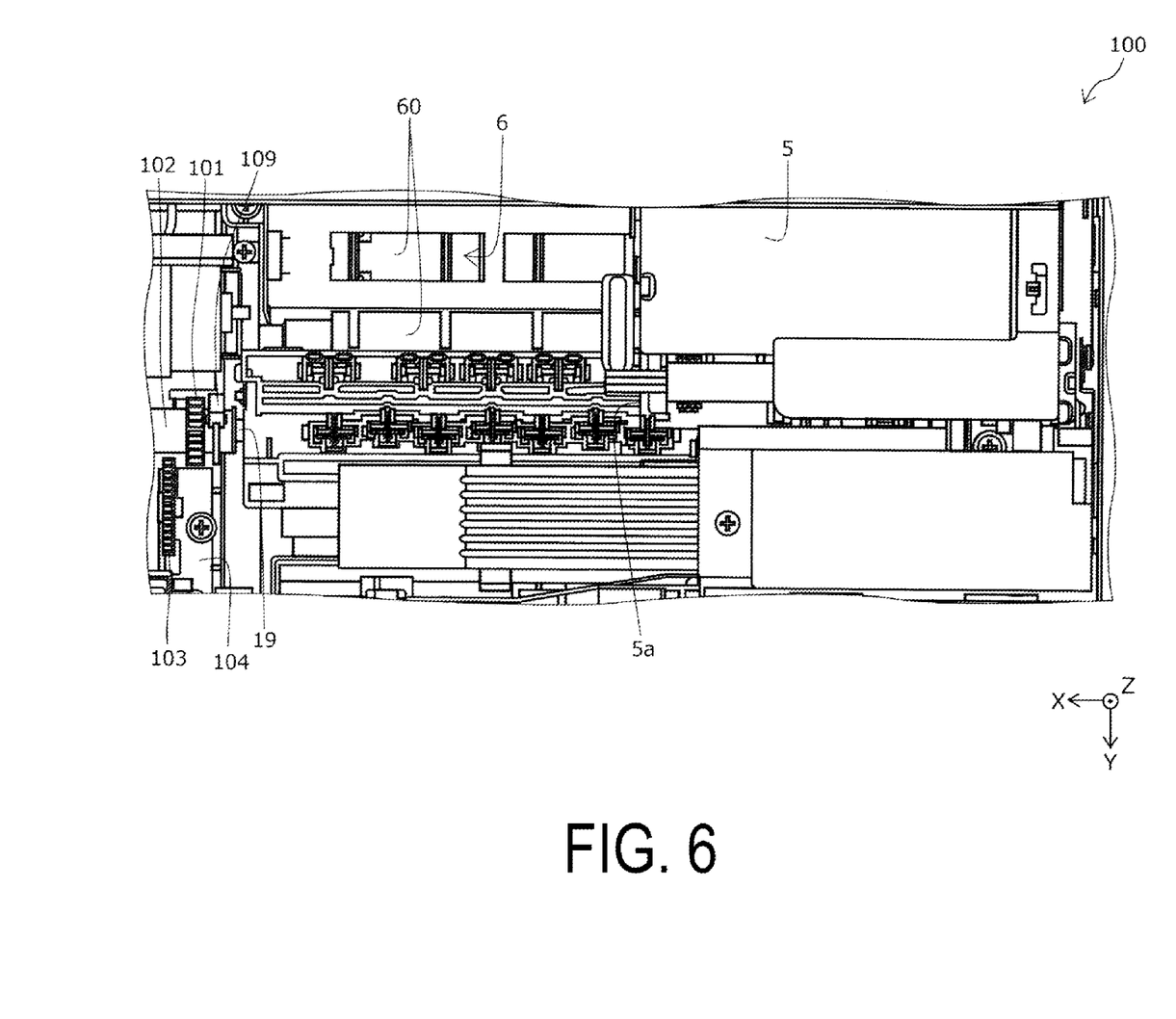
FIG. 6 is a plan view illustrating the periphery of the opening/closing mechanism of the opening/closing cover of the recording device of FIG. 1.

In addition, as illustrated in FIGS. 2 to 5 and the like, the medium accommodation unit 3 can be attached to the main body 2 by being inserted in the −Y direction, which is the insertion direction, through the opening portion 21 provided in the main body 2. As illustrated in FIGS. 4 and 5 and the like, the medium accommodation unit 3 includes, on a rear end side in the insertion direction, the opening/closing cover 33 that can be opened and closed in a state where the medium accommodation unit 3 is attached to the main body 2. Here, when the opening/closing cover 33 is brought into the open state, at least part of the medium can be placed at the opening/closing cover 33, and by being brought into the closed state, the opening/closing cover 33 can close the opening/closing cover 33. The opening/closing cover 33 is configured to also serve as a medium placement space by being brought into the open state in this manner, and thus it is possible to downsize the device in a direction intersecting the gravitational direction when the opening/closing cover 33 is in the closed state. In addition, with such a configuration, since the opening portion 21 can be closed in the closed state, it is possible to suppress foreign matter such as dust entering the main body 2 through the opening portion 21.

In detail, the medium accommodation unit 3 includes the first region 31 on the −Y direction side, which is a front end side in the insertion direction, and includes the second region 32 on the +Y direction side, which is a rear end side in the insertion direction. When the opening/closing cover 33 is brought into the open state, at least part of the recorded medium can be placed at the opening/closing cover 33. With such a configuration, the user can take out the recorded medium from the recording device 1 without detaching the medium accommodation unit 3 from the main body 2. That is, such a configuration can improve the workability of the user.

Figure 11:
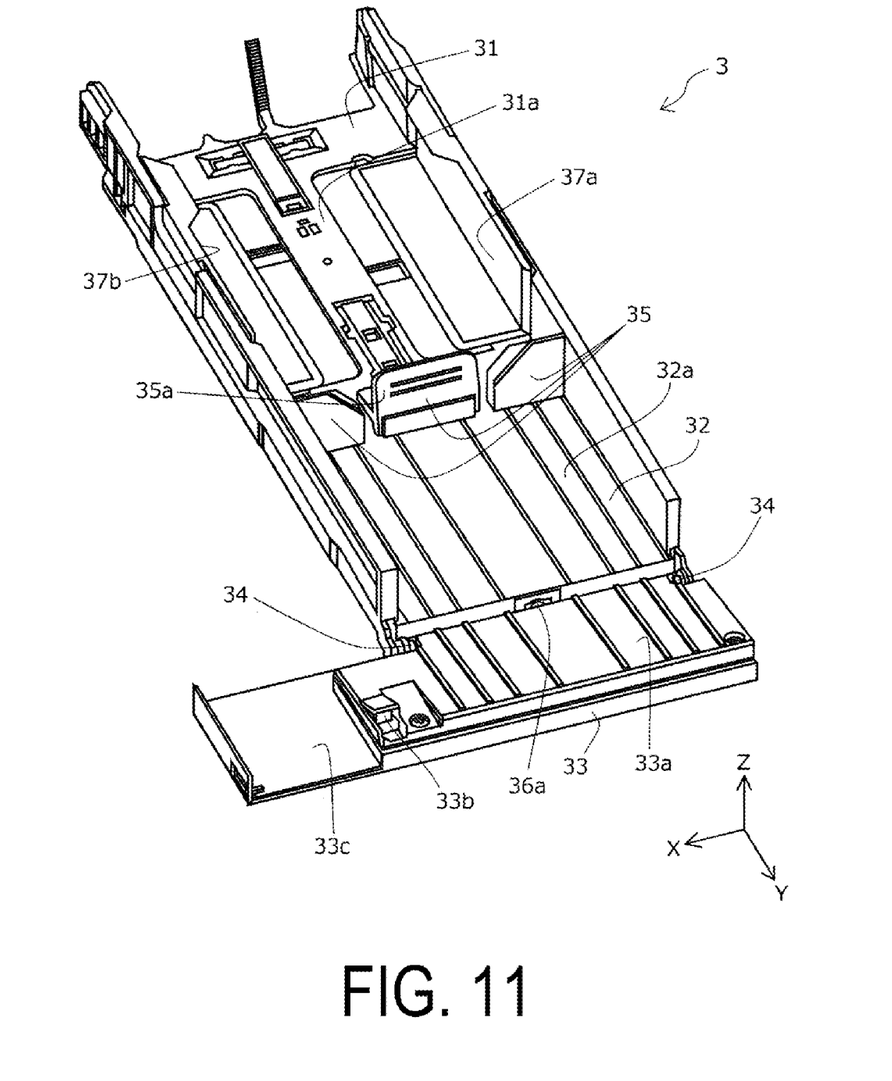
FIG. 11 is a perspective view illustrating a medium accommodation unit of the recording device of FIG. 1.

Here, as illustrated in FIGS. 2, 11, 12, and the like, the medium accommodation unit 3 includes a front surface 31a in the first region 31 and a front surface 32a in the second region 32, both of which are upper surfaces in the gravitational direction. The medium accommodation unit 3 is configured such that the pre-recording medium can be placed at the front surface 31a and the recorded medium can be placed at the front surface 32a. As illustrated in FIGS. 11 and 12, a width adjustment unit 37a and a width adjustment unit 37b that are movable along the X-axis direction so as to correspond to the width of the medium to be used are provided at the front surface 31a. Moreover, a movable partition wall 35a of the partition wall 35 is movable along the Y-axis direction so as to correspond to the length of the medium to be used. The recording device 1 according to the embodiment is provided with the medium accommodation unit 3 having such a configuration and thus can perform recording on the media having a plurality of sizes.

At least part of the recorded medium can be placed at a front surface 33a, which is the upper surface in the gravitational direction when the opening/closing cover 33 is in the open state. Here, as illustrated in FIG. 2, the front surface 32a and the front surface 33a when the opening/closing cover 33 is in the open state are inclined such that a position where the recorded medium is placed becomes higher toward the +Y direction corresponding to the discharge direction of the recorded medium. Such inclination of the front surface 32a and the front surface 33a when the opening/closing cover 33 is in the open state can suppress the recorded medium falling out from the recording device 1 when the recorded medium is discharged, and can suppress the recorded media being stacked randomly.

Here, as illustrated in FIGS. 3 to 5 and the like, the opening/closing cover 33 is provided with a recessed portion 33b at the front surface 33a, and the main body 2 is provided with a fitting portion 105 provided with a protruding portion 105b to be fitted to the recessed portion 33b. The fitting portion 105 is configured to rotate about a rotation shaft 106 when the opening/closing cover 33 is in the closed state so as to be movable between a position where the fitting portion 105 can be fitted to the recessed portion 33b and a position where the fitting portion 105 cannot be fitted to the recessed portion 33b. When the opening/closing cover 33 is in the closed state, the protruding portion 105b is fitted to the recessed portion 33b so that the closed state is maintained. That is, the fitting portion 105 serves as a maintaining unit that maintains the opening/closing cover 33 in the closed state.

Here, a rotating mechanism of the fitting portion 105 will be described. As described above, the recording device 1 according to the embodiment can transport the medium along the transport path K1 and the transport path K2. In addition, the ejecting head 4 reciprocates together with the carriage 5 in the width direction (X-axis direction) intersecting the transport direction of the medium, so that a recording operation can be performed. Here, the rotating roller 13, the transport roller pair 15, the discharge roller pair 18, and the like constitute a medium transport unit, and the carriage 5, a motor (not illustrated) that applies a driving force for moving the carriage 5, and the like constitute a moving mechanism that reciprocates the ejecting head 4 in the width direction.

As illustrated in FIGS. 3 to 6 and the like, the driving roller 19 constituting the discharge roller pair 18 is provided with a lever 109 that can rotate in a certain rotation range in conjunction with rotation of the driving roller 19, and a toothed gear 101 that rotates in conjunction with rotation of the driving roller 19. In conjunction with rotation of the driving roller 19, the lever 109 rotates to a position facing a side surface 5a of the carriage 5 in the X-axis direction and a position not facing the side surface 5a of the carriage 5 in the X-axis direction.

The toothed gear 101 is biased toward the −X direction side by a spring 102 illustrated in FIG. 3 and the like, but, when the lever 109 is disposed at the position illustrated in FIGS. 3 to 6 and moved toward the +X direction side by the side surface 5a of the carriage 5 in conjunction with movement of the carriage 5 toward the +X direction side, the toothed gear 101 moves toward the +X direction side in conjunction with the movement of the lever 109 in the +X direction. The arrangement of the lever 109 to the position illustrated in FIGS. 3 to 6, that is, the arrangement of the lever 109 to the position facing the side surface 5a of the carriage 5 in the X-axis direction is performed by rotating the driving roller 19 in a direction opposite to the direction during the transport of the medium. On the other hand, the arrangement of the lever 109 to the position not facing the side surface 5a of the carriage 5 in the X-axis direction is performed by rotating the driving roller 19 in the same direction as the direction during the transport of the medium. At a position on the +X direction side to which the toothed gear 101 has moved, there is a pinion 103 that meshes with the toothed gear 101, and teeth 101a of the toothed gear 101 mesh with teeth 103a of the pinion 103.

Since the toothed gear 101 rotates in conjunction with rotation of the driving roller 19, the pinion 103 meshing with the toothed gear 101 also rotates in conjunction with rotation of the driving roller 19. Here, as illustrated in FIGS. 3 to 5, the pinion 103 meshes with a rack 104 that is provided with teeth 104a meshing with the teeth 103a of the pinion 103 and that extends in the Y-axis direction. Thus, when the pinion 103 rotates via the toothed gear 101 in conjunction with rotation of the driving roller 19, the rack 104 moves along the Y-axis direction. As illustrated in FIGS. 3 to 5, an end portion 104b of the rack 104 on the +Y direction side is disposed at a position capable of coming into contact with an end portion 105a of the fitting portion 105. When the rack 104 is moved toward the +Y direction side in a state in which the fitting portion 105 maintains the opening/closing cover 33 in the closed state, the fitting portion 105 rotates and the fitting of the protruding portion 105b to the recessed portion 33b is released.

In summary, the recording device 1 according to the embodiment includes the transport unit such as the transport roller pair 15 that transports the medium in the transport direction, the moving mechanism such as the carriage 5 that reciprocates the ejecting head 4 in the width direction, the fitting portion 105 serving as the maintaining unit that maintains the opening/closing cover 33 in the closed state, and the toothed gear 101, the pinion 103, the rack 104, and the like that serve as the release mechanism that releases the closed state of the opening/closing cover 33. The release mechanism is configured to start a release operation of releasing the closed state of the opening/closing cover 33 in conjunction with movement of the ejecting head 4 in the width direction. Since the recording device 1 according to the embodiment has such a configuration, the release operation can automatically start in conjunction with movement of the ejecting head 4 in the width direction upon start of recording. Thus, it is possible to save the user the trouble of opening the opening/closing cover 33 and suppress damage to the medium by the opening/closing cover 33 forgotten to be opened. In addition, use of the moving mechanism of the ejecting head 4 as the release mechanism eliminates the necessity of providing a dedicated power source for the release mechanism, which can reduce the cost.

Here, the opening/closing cover 33 according to the embodiment is configured to be changed from the closed state to the open state by its own weight when the closed state is released. However, in a case where there is no configuration of adjusting the rotation velocity of the opening/closing cover 33, the opening/closing cover 33 may vigorously collide with the installation surface of the recording device 1 when the opening/closing cover 33 is changed from the closed state to the open state, which may make a loud sound and damage the opening/closing cover 33. Thus, as illustrated in FIGS. 11 and 7 and the like, the opening/closing cover 33 according to the embodiment includes an opening/closing velocity adjustment unit 36 that adjusts the rotation velocity when the opening/closing cover 33 is changed from the closed state to the open state.

Figure 7:
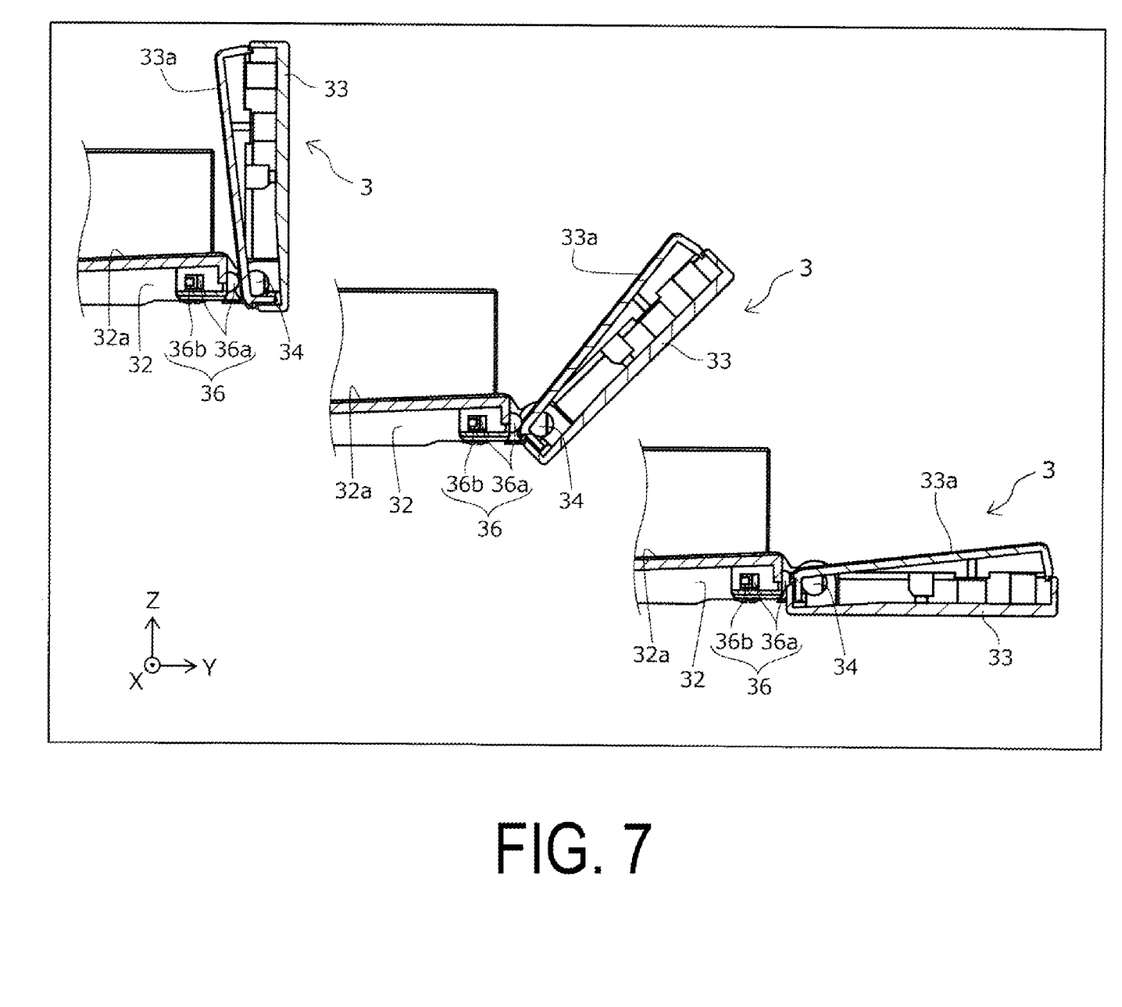
FIG. 7 is a side cross-sectional view illustrating a situation in which the opening/closing cover of the recording device of FIG. 1 is changed from the closed state to the open state.

As illustrated in FIG. 7, the opening/closing velocity adjustment unit 36 is provided at the second region 32, and includes a protrusion portion 36a movable along the Y-axis direction at a position that can come into contact with the opening/closing cover 33, and a spring 36b that biases the protrusion portion 36a in the +Y direction toward the opening/closing cover 33. When the opening/closing cover 33 is changed from the closed state to the open state, the state is changed from the upper left drawing of FIG. 7 to the middle drawing of FIG. 7, and then to the lower right drawing of FIG. 7. As illustrated in each drawing of FIG. 7, the protrusion portion 36a is continuously in contact with the opening/closing cover 33 regardless of the state of the opening/closing cover 33. Thus, when the state is changed from the upper left drawing of FIG. 7 to the middle drawing of FIG. 7, and then to the lower right drawing of FIG. 7, a friction force between the protrusion portion 36a and the opening/closing cover 33 adjusts the rotation velocity of the opening/closing cover 33 when the opening/closing cover 33 is changed from the closed state to the open state to be lower than that in a configuration in which the opening/closing velocity adjustment unit 36 is not provided.

As described above, the opening/closing velocity adjustment unit 36 that adjusts the opening/closing velocity of the opening/closing cover 33 when the posture is changed from the closed state to the open state may be provided. This is because, for example, it is possible to suppress a situation in which the user opens the opening/closing cover 33 too vigorously, the opening/closing cover 33 violently collides with the installation surface of the recording device 1, a loud sound is generated, and the opening/closing cover 33 is damaged.

Figure 8:
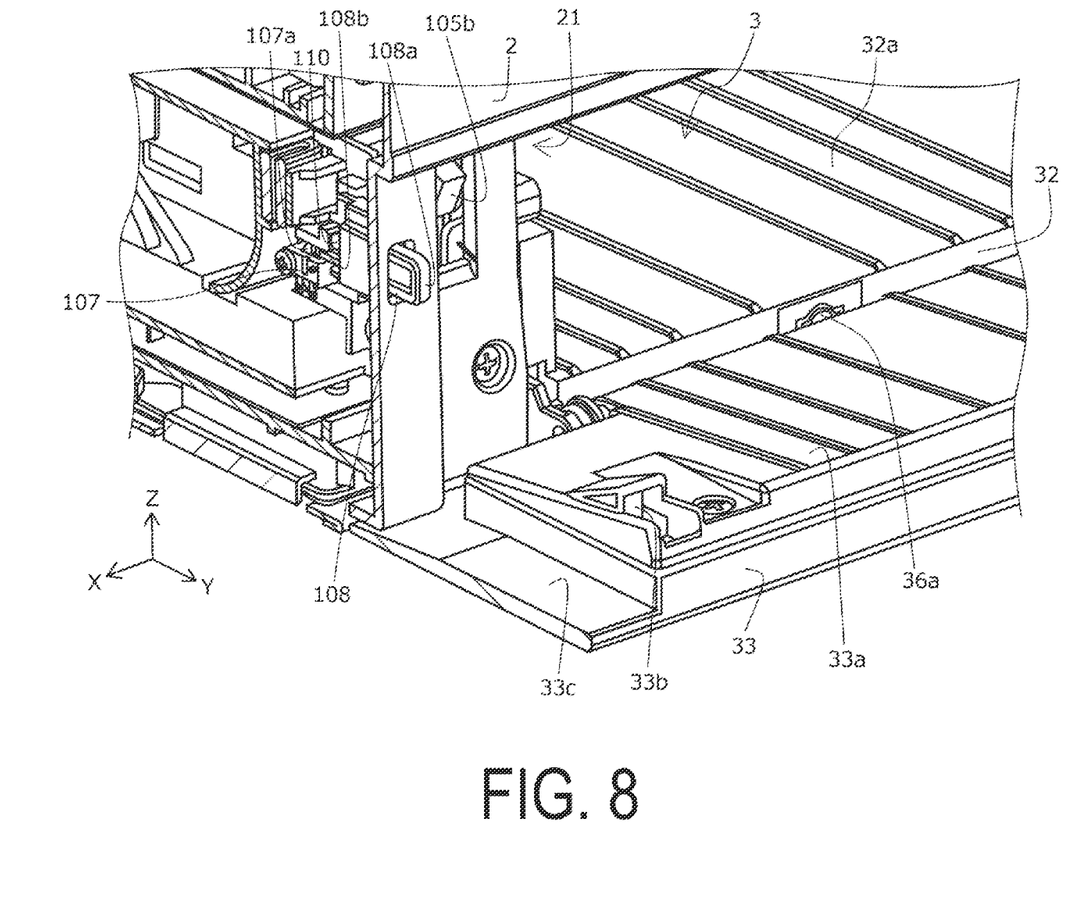
FIG. 8 is a perspective view illustrating a periphery of an opening/closing sensor of the recording device of FIG. 1.
Figure 9:
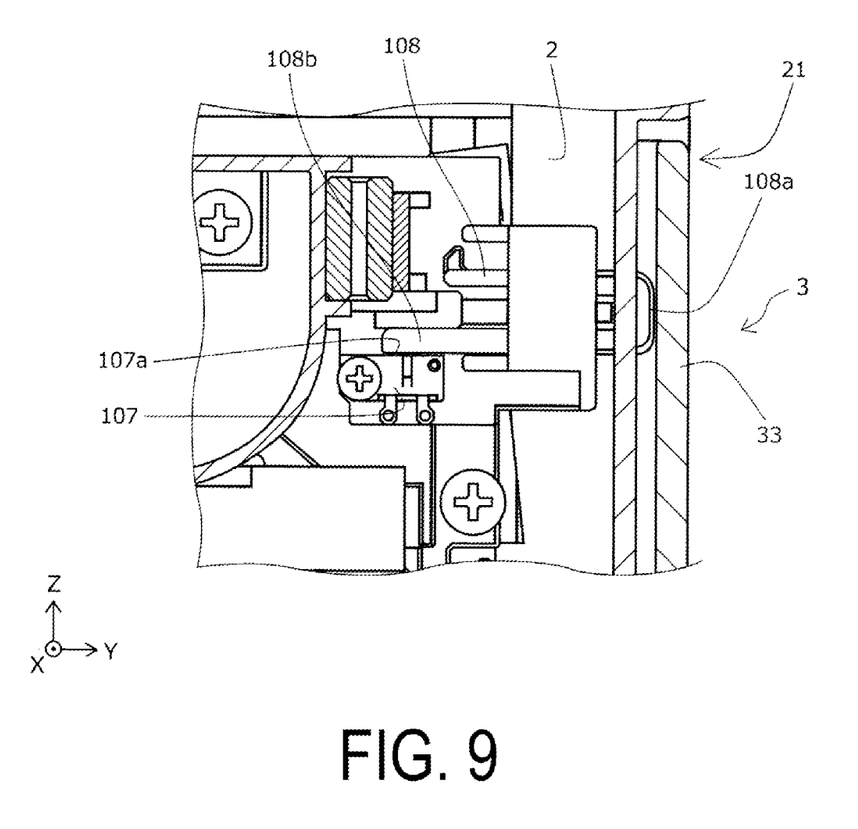
FIG. 9 is a side cross-sectional view illustrating the periphery of the opening/closing sensor of the recording device of FIG. 1 when the opening/closing cover is in the closed state.
Figure 10:
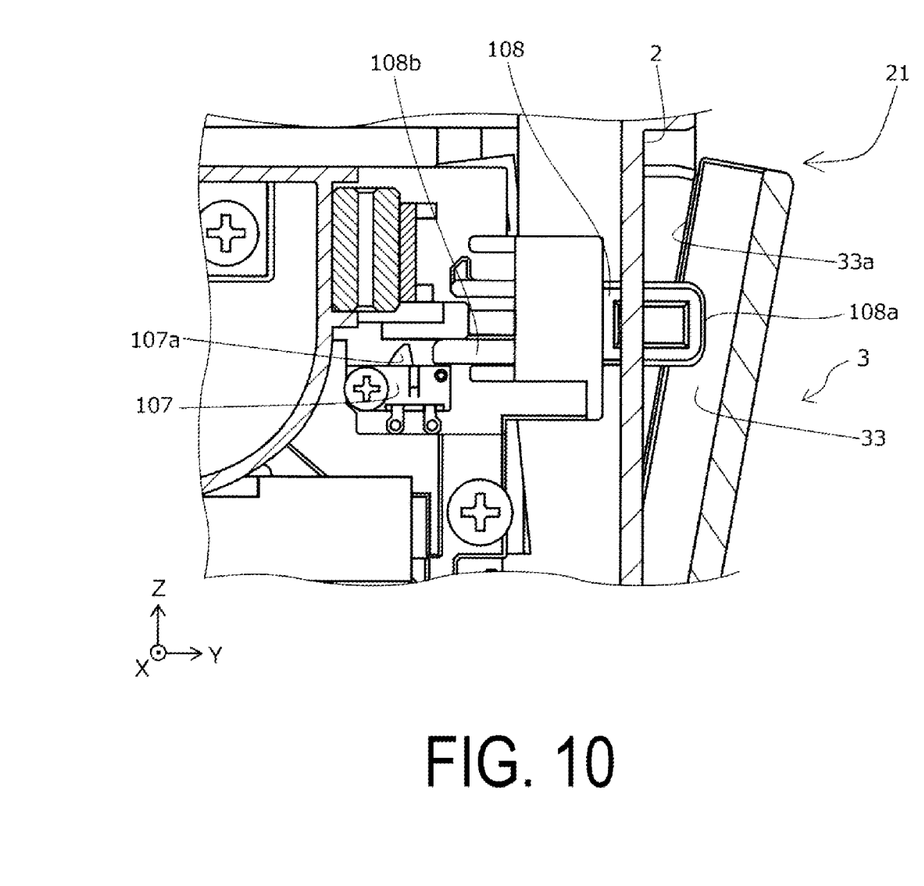
FIG. 10 is a side cross-sectional view illustrating the periphery of the opening/closing sensor of the recording device of FIG. 1 when the opening/closing cover is changed from the closed state to the open state.

Moreover, as illustrated in FIGS. 8 to 10, the recording device 1 according to the embodiment includes an opening/closing sensor 107 that detects whether the opening/closing cover 33 is in the open state or the closed state. Thus, by using, for example, a detection result of the opening/closing sensor 107, the recording device 1 according to the embodiment can eliminate an operation of opening the opening/closing cover 33 before start of recording when the opening/closing cover 33 is in the open state, and shorten the recording start operation.

In detail, as illustrated in FIGS. 8 to 10, the main body 2 includes a moving portion 108 including a distal end 108a that comes into contact with a surface 33c of the opening/closing cover 33 when the opening/closing cover 33 is in the closed state. The moving portion 108 is configured to be biased toward the +Y direction side by a spring 110 and be movable within a predetermined range along the Y-axis direction. The pressing portion 108b is provided at a part of the moving portion 108 on the −Y direction side, and as can be seen from comparison between FIGS. 9 and 10, a switch unit 107a of the opening/closing sensor 107 is configured to be pressed in the −Z direction in conjunction with movement of the moving portion 108 toward the −Y direction side. The opening/closing sensor 107 determines that the opening/closing cover 33 is in the closed state when the switch unit 107a is pressed in the −Z direction, and determines that the opening/closing cover 33 is in the open state when the switch unit 107a is not pressed in the −Z direction. However, a mechanism of detecting the open or closed state of the opening/closing cover 33 is not particularly limited.

Note that the disclosure is not limited to the aforementioned embodiment, and many variations are possible within the scope of the disclosure as described in the appended claims. It goes without saying that such variations also fall within the scope of the disclosure. For example, the opening/closing cover 33 does not need to be provided. In the case of such a configuration, the medium accommodation unit 3 is configured to protrude from the opening of the housing, which can suppress falling of the recorded medium and facilitate takeout of the recorded medium. With such a configuration, it is possible to eliminate the opening/closing cover 33, the mechanism for operating the opening/closing cover 33, and the opening/closing operation time.

What is claimed is:

1. A recording device comprising:
an ejecting head configured to perform recording on media;
a main body provided with the ejecting head; and
a medium accommodation tray configured to be attached to and detached from the main body and configured to accommodate the media, wherein
the medium accommodation tray includes:
a first region configured to accommodate, among the media, a pre-recording medium before being subjected to recording by the ejecting head and
a second region configured to accommodate, among the media, a recorded medium after being subjected to the recording by the record ejecting head,
wherein
the medium accommodation tray is attached to the main body by being inserted in an insertion direction through an opening portion provided at the main body,
the medium accommodation tray includes, on a rear end side in the insertion direction, an opening/closing cover configured to be opened and closed in a state where the medium accommodation tray is attached to the main body,
when the opening/closing cover is brought into an open state, at least part of the media is placeable at the opening/closing cover, and
by being brought into a closed state, the opening/closing cover is configured to close the opening portion.

2. The recording device according to claim 1, wherein
the medium accommodation tray includes the first region and the second region at positions not overlapping each other as viewed from a gravitational direction and
a medium accommodation space in the first region and a medium accommodation space in the second region overlap each other in the gravitational direction.

3. The recording device according to claim 1, wherein
the medium accommodation tray includes the first region on a front end side in the insertion direction and includes the second region on a rear end side in the insertion direction and
when the opening/closing cover is brought into the open state, at least part of the recorded medium is placeable at the opening/closing cover.

4. The recording device according to claim 1, further comprising:
a transport unit configured to transport the media in a transport direction;
a moving roller configured to reciprocate the ejecting head in a width direction intersecting the transport direction;
a fitting portion configured to maintain the opening/closing cover in the closed state; and
a release mechanism configured to release the closed state of the opening/closing cover, wherein
the release mechanism is configured to start a release operation of releasing the closed state of the opening/closing cover in conjunction with movement of the ejecting head in the width direction.

5. The recording device according to claim 1, further comprising
an opening/closing velocity adjustment unit configured to adjust an opening/closing velocity of the opening/closing cover when posture is changed from the closed state to the open state.

6. The recording device according to claim 1, further comprising
an opening/closing sensor configured to detect whether the opening/closing cover is in the open state or the closed state.

7. A recording device comprising:
an ejecting head configured to perform recording on media;
a main body provided with the ejecting head; and
a medium accommodation tray configured to be attached to and detached from the main body and configured to accommodate the media, wherein
the medium accommodation tray includes:
a first region configured to accommodate, among the media, a pre-recording medium before being subjected to recording by the ejecting head and a second region configured to accommodate, among the media, a recorded medium after being subjected to the recording by the ejecting head,
the medium accommodation tray is attached to the main body by being inserted in an insertion direction through an opening portion provided at the main body,
wherein when the medium accommodation tray is inserted into the opening portion, the first and second regions are within the main body.

8. The recording device according to claim 7, wherein
the medium accommodation tray includes the first region and the second region at positions not overlapping each other as viewed from a gravitational direction and
a medium accommodation space in the first region and a medium accommodation space in the second region overlap each other in the gravitational direction.

9. The recording device according to claim 7, wherein
the medium accommodation tray includes, on a rear end side in the insertion direction, an opening/closing cover configured to be opened and closed in a state where the medium accommodation tray is attached to the main body,
when the opening/closing cover is brought into an open state, at least part of the media is placeable at the opening/closing cover, and
by being brought into a closed state, the opening/closing cover is configured to close the opening portion.

10. The recording device according to claim 9, wherein
the medium accommodation tray includes the first region on a front end side in the insertion direction and includes the second region on a rear end side in the insertion direction and
when the opening/closing cover is brought into the open state, at least part of the recorded medium is placeable at the opening/closing cover.

11. The recording device according to claim 9, further comprising:
a transport unit configured to transport the media in a transport direction;
a moving roller configured to reciprocate the ejecting head in a width direction intersecting the transport direction;
a fitting portion configured to maintain the opening/closing cover in the closed state; and
a release mechanism configured to release the closed state of the opening/closing cover, wherein
the release mechanism is configured to start a release operation of releasing the closed state of the opening/closing cover in conjunction with movement of the ejecting head in the width direction.

12. The recording device according to claim 9, further comprising
an opening/closing velocity adjustment unit configured to adjust an opening/closing velocity of the opening/closing cover when posture is changed from the closed state to the open state.

13. The recording device according to claim 9, further comprising
an opening/closing sensor configured to detect whether the opening/closing cover is in the open state or the closed state.

14. A recording device comprising:
an ejecting head configured to perform recording on media;
a main body provided with the ejecting head; and
a medium accommodation tray configured to be attached to and detached from the main body and configured to accommodate the media, wherein
the medium accommodation tray includes:
a first region configured to accommodate, among the media, a pre-recording medium before being subjected to recording by the ejecting head and a second region configured to accommodate, among the media, a recorded medium after being subjected to the recording by the recis cting head, wherein the first region does not overlap the second region as viewed from a gravitational direction, and a first medium accommodation space in the first region overlap a second medium accommodation space in the second region in the gravitational direction, wherein a partition wall that partitions the first medium accommodation space and the second medium accommodation space.

15. The recording device according to claim 14, wherein the partition wall configured to be movable in the first medium accommodation space.

* * * * *